United States Patent
Morimura et al.

(10) Patent No.: US 10,045,173 B1
(45) Date of Patent: Aug. 7, 2018

(54) VEHICLE OUTSIDE NOTIFICATION DEVICE

(71) Applicant: TOYOTA JIDOSHA KABUSHIKI KAISHA, Toyota-shi, Aichi (JP)

(72) Inventors: Junichi Morimura, Sunto-gun (JP); Junya Watanabe, Sunto-gun (JP); Seiji Arakawa, Sunto-gun (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/866,026

(22) Filed: Jan. 9, 2018

(30) Foreign Application Priority Data

Jun. 12, 2017 (JP) .................................. 2017-115283

(51) Int. Cl.
| | |
|---|---|
| *B60Q 1/26* | (2006.01) |
| *H04W 4/46* | (2018.01) |
| *B60Q 1/52* | (2006.01) |
| *B60Q 1/34* | (2006.01) |
| *G08G 1/0967* | (2006.01) |
| *B60W 40/04* | (2006.01) |
| *B60Q 1/28* | (2006.01) |

(52) U.S. Cl.
CPC ................ *H04W 4/46* (2018.02); *B60Q 1/28* (2013.01); *B60Q 1/346* (2013.01); *B60Q 1/525* (2013.01); *B60W 40/04* (2013.01); *G08G 1/096791* (2013.01); *B60W 2550/408* (2013.01)

(58) Field of Classification Search
CPC .................................... B60Q 1/00; B60R 1/00
See application file for complete search history.

(56) References Cited

U.S. PATENT DOCUMENTS

| | | | |
|---|---|---|---|
| 9,868,394 B1* | 1/2018 | Fields | B60Q 9/008 |
| 2011/0140919 A1* | 6/2011 | Hara | B60Q 1/50 |
| | | | 340/907 |

FOREIGN PATENT DOCUMENTS

| | | |
|---|---|---|
| JP | 2010-003225 A | 1/2010 |
| JP | 2011-123636 A | 6/2011 |
| JP | 2015-143093 A | 8/2015 |
| JP | 2016-005932 A | 1/2016 |

* cited by examiner

*Primary Examiner* — Shirley Lu
(74) *Attorney, Agent, or Firm* — Sughrue Mion, PLLC

(57) ABSTRACT

Provided is a vehicle outside notification device including a notification necessity determination unit configured to determine whether or not it is necessary to provide a traffic participant in a vicinity of a host vehicle with notification regarding an action schedule of the host vehicle, a preceding vehicle determination unit configured to determine whether or not a preceding vehicle is present in a case where it is determined that it is necessary to provide the notification, a notification output unit configured to output the notification, and a notification control unit configured to control the notification output unit. The notification control unit outputs the notification in a case where the preceding vehicle determination unit determines that the preceding vehicle is not present. The notification control unit restricts the output of the notification in a case where the preceding vehicle determination unit determines that the preceding vehicle is present.

4 Claims, 5 Drawing Sheets

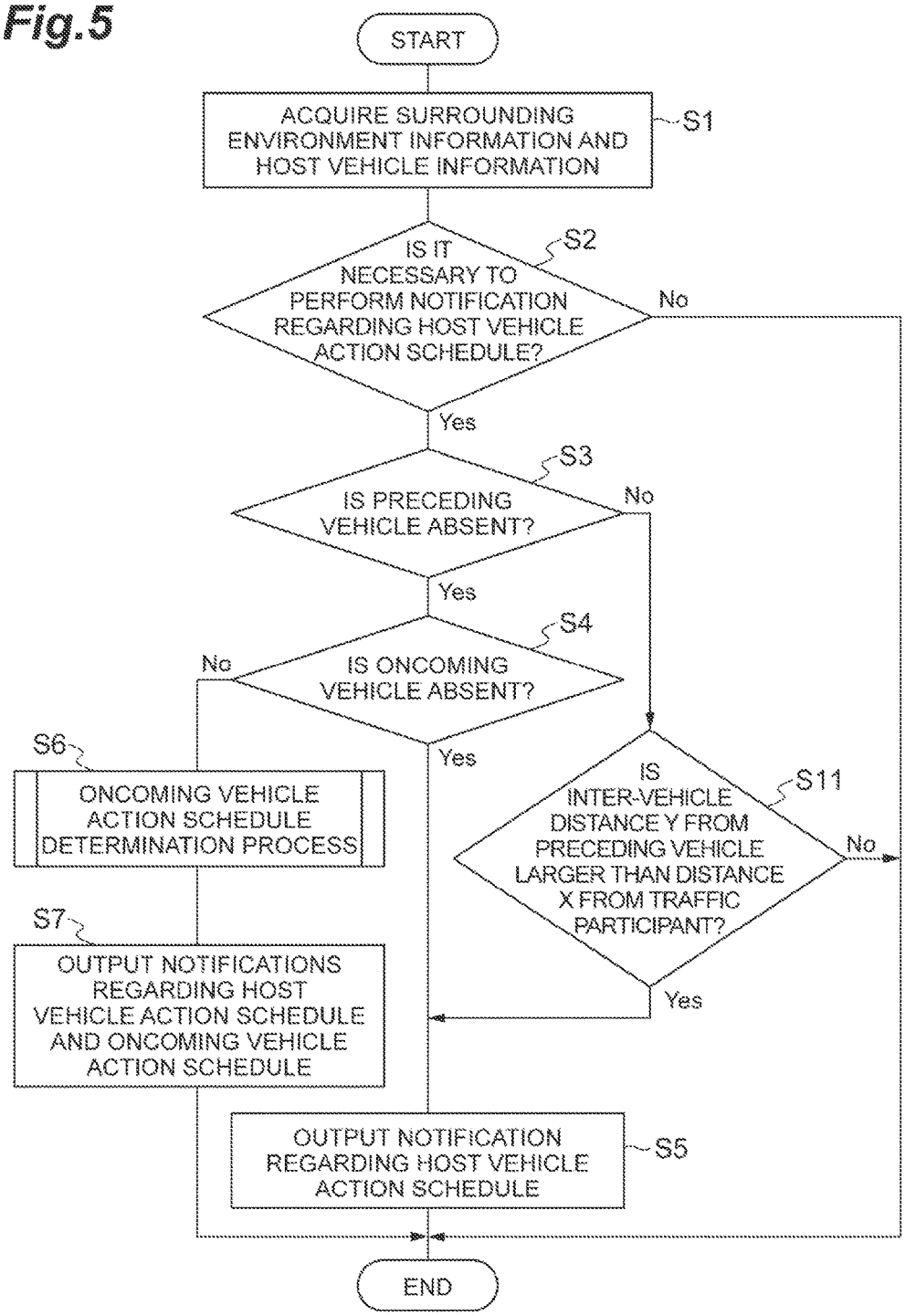

000
VEHICLE OUTSIDE NOTIFICATION DEVICE

BACKGROUND OF THE INVENTION

Field of the Invention

An aspect of the present invention relates to a vehicle outside notification device.

Related Background Art

In the related art, an oncoming pedestrian notification device disclosed in Japanese Unexamined Patent Publication No. 2015-143093 has been known as a technique related to a vehicle outside notification device. In the oncoming pedestrian notification device disclosed in Japanese Unexamined Patent Publication No. 2015-143093, when it is determined that a pedestrian (traffic participant) is present, a road is irradiated with information to be transmitted to the pedestrian as a predetermined form on the basis of a detection position of the pedestrian, so that the pedestrian is notified of the information.

SUMMARY

In the related art described above, each of a plurality of vehicles may output a notification in a traffic situation (for example, congestion or the like) where the plurality of vehicles lie in a row. In this case, there is a possibility that a traffic participant feels troublesome.

Consequently, an object of an aspect of the invention is to provide a vehicle outside notification device capable of preventing a traffic participant from feeling troublesome.

According to an aspect of the invention, there is provided a vehicle outside notification device including a notification necessity determination unit configured to determine whether or not it is necessary to provide a traffic participant in a vicinity of a host vehicle with notification regarding an action schedule of the host vehicle, on the basis of a surrounding environment of the host vehicle and a state of the host vehicle, a preceding vehicle determination unit configured to determine whether or not a preceding vehicle of the host vehicle is present on the basis of the surrounding environment of the host vehicle, in a case where the notification necessity determination unit determines that it is necessary to provide the notification, a notification output unit configured to output the notification, and a notification control unit configured to control the notification output unit on the basis of a determination result of the preceding vehicle determination unit, in which the notification control unit is configured to output the notification from the notification output unit in a case where the preceding vehicle determination unit determines that the preceding vehicle is not present, and is configured to restrict the output of the notification from the notification output unit in a case where the preceding vehicle determination unit determines that the preceding vehicle is present.

In the vehicle outside notification device, a notification is output to the traffic participant in the vicinity of the host vehicle in a case where the preceding vehicle of the host vehicle is not present. On the other hand, in a case where the preceding vehicle of the host vehicle is present, the output of the notification is restricted. Therefore, in a traffic situation, such as congestion, where a plurality of vehicles lie in a row, it is possible to suppress the output of the notification so as to satisfy a necessary and sufficient condition. As a result, it is possible to prevent the traffic participant from feeling troublesome.

In the vehicle outside notification device according to the aspect of the invention, the notification control unit may be configured not to output the notification from the notification output unit when an inter-vehicle distance between the host vehicle and the preceding vehicle is equal to or less than a distance between the host vehicle and the traffic participant in a case where the preceding vehicle determination unit determines that the preceding vehicle is present, and may be configured to output the notification from the notification output unit when the inter-vehicle distance between the host vehicle and the preceding vehicle is larger than the distance between the host vehicle and the traffic participant in a case where the preceding vehicle determination unit determines that the preceding vehicle is present. With such a configuration, it is possible to effectively output the notification to the traffic participant attempting to pass through between the host vehicle and the preceding vehicle.

The vehicle outside notification device according to the aspect of the invention may further include an oncoming vehicle action schedule determination unit configured to determine an action schedule of an oncoming vehicle in a case where the oncoming vehicle of the host vehicle is present, in which the notification control unit may be configured to output notifications regarding the action schedule of the host vehicle and the action schedule of the oncoming vehicle which is determined by the oncoming vehicle action schedule determination unit from the notification output unit, in a case where the oncoming vehicle is present. With such a configuration, in a case where the oncoming vehicle is present, it is possible to output the notification further considering the action schedule of the oncoming vehicle.

According to the aspect of the invention, it is possible to provide a vehicle outside notification device capable of preventing a traffic participant from feeling troublesome.

BRIEF DESCRIPTION OF THE DRAWINGS

FIG. 5 is a flowchart illustrating an example of processing executed by the vehicle outside notification device according to the second embodiment.

DESCRIPTION OF THE PREFERRED EMBODIMENTS

Figure 1:
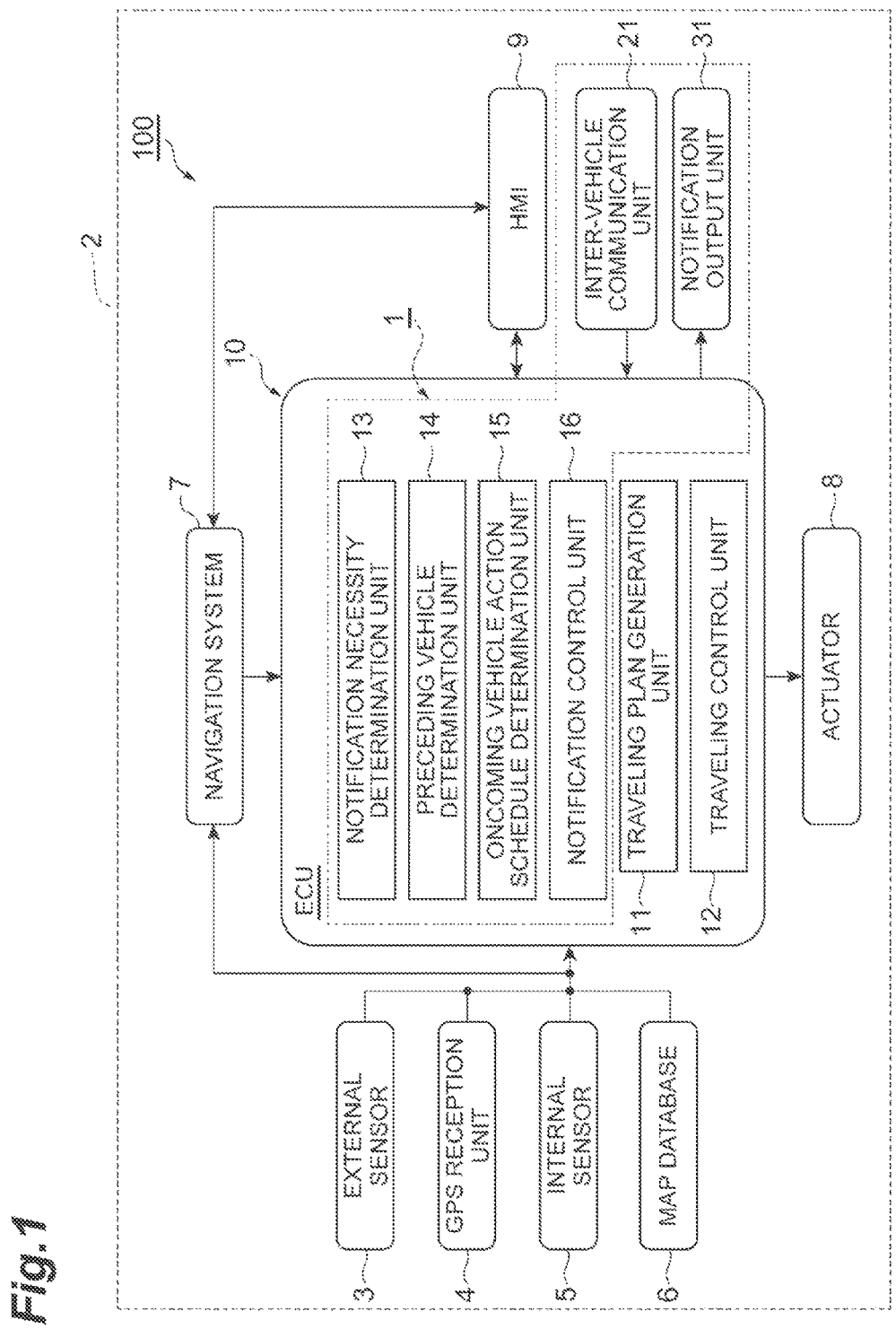
FIG. 1 is a block diagram illustrating a configuration of a vehicle mounted with a vehicle outside notification device according to a first embodiment.

Hereinafter, embodiments will be described with reference to the accompanying drawings. In the following description, the same or equivalent components will be denoted by the same reference numerals and signs, and a repeated description will be omitted.

First Embodiment

FIG. 1 is a block diagram illustrating a configuration of a host vehicle mounted with a vehicle outside notification device according to a first embodiment. As illustrated in FIG. 1, a vehicle outside notification device 1 is mounted on a host vehicle 2 which is an automatic driving vehicle including an automatic driving system 100. The automatic driving is vehicle control for causing the host vehicle 2 to automatically travel toward a preset destination without causing an occupant (including a driver or the like) of the host vehicle 2 to perform a driving operation. First, the automatic driving system 100 will be described.

The automatic driving system 100 is a system that causes the host vehicle 2 to travel by automatic driving. The automatic driving system 100 includes an external sensor 3, a Global Positioning System (GPS) reception unit 4, an internal sensor 5, a map database 6, a navigation system 7, an actuator 8, a Human Machine Interface (HMI) 9, and an Electronic Control Unit (ECU) 10.

The external sensor 3 is a detection apparatus that detects the surrounding environment (external state) which is the environment surrounding the vicinity of the host vehicle 2. The external sensor 3 includes at least one of a camera and a radar sensor. The camera is an imaging apparatus that images the surrounding environment. The camera is provided, for example, on the back of a windshield of the host vehicle 2. The camera transmits imaging information to the ECU 10. The camera may be a monocular camera or may be a stereo camera. The stereo camera includes two imaging units that are disposed so as to reproduce binocular parallax. The imaging information of the stereo camera also includes information in the depth direction. The radar sensor is a detection apparatus that detects an object in the vicinity of the host vehicle 2 by using radio waves (for example, millimeter waves) or rays of light. The radar sensor includes, for example, a millimeter wave radar or Laser Imaging Detection and Ranging (LIDAR). The radar sensor transmits the radio waves or the rays of light to the vicinity of the host vehicle 2 and receives the radio waves or rays of light reflected from an object to detect the object. The radar sensor transmits object information to the ECU 10. The number of cameras and radar sensors mounted and the mounting positions thereof are not particularly limited.

The GPS reception unit 4 receives signals from three or more GPS satellites to acquire positional information indicating the position of the host vehicle 2. The positional information includes, for example, latitude and longitude. The GPS reception unit 4 transmits the measured positional information of the host vehicle 2 to the ECU 10. Another means for specifying the latitude and the longitude of the host vehicle 2 may be used instead of the GPS reception unit 4.

The internal sensor 5 is a detection apparatus that detects the state of the host vehicle 2 (the mode of motion of the host vehicle 2). The internal sensor 5 also includes at least a vehicle speed sensor. The vehicle speed sensor is a detection apparatus that detects the speed of the host vehicle 2. The vehicle speed sensor to be used may be a wheel speed sensor which is provided in a wheel of the host vehicle 2, a drive shaft rotating integrally with the wheel, or the like to detect the rotation speed of the wheel. The vehicle speed sensor transmits the detected vehicle speed information to the ECU 10. The internal sensor 5 may include an acceleration sensor or a yaw rate sensor. The acceleration sensor is a detection apparatus that detects the acceleration of the host vehicle 2. The acceleration sensor includes a front-back acceleration sensor that detects the acceleration of the host vehicle 2 in the front-back direction and a horizontal acceleration sensor that detects the horizontal acceleration of the host vehicle 2. The acceleration sensor transmits the acceleration information of the host vehicle 2 to the ECU 10. The yaw rate sensor is a detection apparatus that detects a yaw rate (rotation angular speed) around the vertical axis of the center of gravity of the host vehicle 2. As the yaw rate sensor, for example, a gyro sensor can be used. The yaw rate sensor transmits the detected yaw rate information of the host vehicle 2 to the ECU 10.

The map database 6 is a database that stores map information. The map database 6 is formed within a Hard Disk Drive (HDD) mounted on the host vehicle 2. The map information includes positional information of roads, lane information, road type information, information regarding the shapes of roads, positional information of intersections and crossroads, positional information of buildings, and the like. The road type information is information for making a distinction of types of roads such as a road for the exclusive use of automobiles, a general road, and the like. The information regarding the shapes of roads includes type information such as a curved portion and a linear portion, a road curvature, and the like. The map database 6 may be stored in a computer in facilities such as an information processing center capable of communicating with the host vehicle 2.

The navigation system 7 is a system that guides an occupant of the host vehicle 2 to a preset destination. The navigation system 7 recognizes a traveling road and a traveling lane of the host vehicle 2 on the basis of the position of the host vehicle 2 which is measured by the GPS reception unit 4 and the map information of the map database 6. The navigation system 7 computationally calculates a target route from the position of the host vehicle 2 to the destination. The navigation system 7 guides an occupant to the target route by using a display panel and a speaker. The navigation system 7 transmits positional information of the host vehicle 2, information regarding the traveling lane of the host vehicle 2, and information regarding the target route of the host vehicle 2 to the ECU 10.

The actuator 8 is an apparatus that executes the traveling control of the host vehicle 2. The actuator 8 includes at least an engine actuator, a brake actuator, and a steering actuator. The engine actuator changes the amount of air to be supplied to the engine (for example, changes throttle opening) in accordance with a control signal from the ECU 10 to control the driving force of the host vehicle 2. Meanwhile, the engine actuator controls a driving force of a motor as a power source in a case where the host vehicle 2 is a hybrid vehicle or an electric vehicle. The brake actuator controls a brake system in accordance with a control signal from the ECU 10 and controls a braking force to be applied to the wheel of the host vehicle 2. As the brake system, for example, a hydraulic brake system can be used. In a case where the host vehicle 2 includes a regenerative brake system, the brake actuator may control both the hydraulic brake system and the regenerative brake system. The steering actuator controls the driving an assist motor controlling a steering torque in an electric power steering system, in accordance with a control signal from the ECU 10. Thereby, the steering actuator controls the steering torque of the host vehicle 2.

The HMI 9 is an interface for outputting and inputting information from and to the occupant of the host vehicle 2. The HMI 9 includes a display panel for displaying image information to, for example, the occupant, a speaker for outputting a sound, and an operation button, a touch panel, or the like for causing the occupant to perform an input operation. The HMI 9 transmits information which is input by the occupant to the ECU 10. The HMI 9 displays the image information based on the control signal from the ECU 10 on a display.

The ECU 10 is an electronic control unit including a Central Processing Unit (CPU), a Read Only Memory (ROM), a Random Access Memory (RAM), a Controller Area Network (CAN) communication circuit, and the like. The ECU 10 is connected to a network for communication by using, for example, a CAN communication circuit. Thereby, the ECU 10 is communicatively connected to the components of the host vehicle 2. The ECU 10 inputs and outputs data by operating the CAN communication circuit on the basis of, for example, a signal which is output by the CPU, stores the input data in the RAM, loads programs stored in the ROM into the RAM, and executes the programs loaded into the RAM to realize functions of the components of the ECU 10. The ECU 10 may be constituted by a plurality of electronic control units. The ECU 10 includes a traveling plan generation unit 11 and a traveling control unit 12 as components.

The traveling plan generation unit 11 generates a traveling plan of the host vehicle 2 on the basis of at least any one of detection results of the external sensor 3 and the internal sensor 5, positional information acquired by the GPS reception unit 4, map information of the map database 6, various pieces of information transmitted from the navigation system 7, and obstacle information recognized on the basis of the detection result of the external sensor 3. The obstacle information is information regarding at least one of the position, size, range, movement direction, and speed of one or a plurality of obstacles (including, for example, a guardrail, a street tree, a building, people, an animal, a bicycle, other vehicles, and the like) in the vicinity of the host vehicle 2.

The traveling plan generation unit 11 starts to generate a traveling plan in a case where the occupant performs an operation of starting automatic driving. The traveling plan includes a long-term traveling plan in which the host vehicle 2 reaches a preset destination from the current position of the host vehicle 2, and a short-term traveling plan corresponding to the actual road environment and the surrounding environment. The long-term traveling plan is a plan depending on map information. The short-term traveling plan is a plan in which the host vehicle 2 travels in a detection range of the external sensor 3 (for example, a range within 150 m ahead of the host vehicle 2).

The traveling plan generation unit 11 generates the long-term traveling plan of the host vehicle 2 on the basis of the target route which is set by the navigation system 7 and the map information of the map database 6. The long-term traveling plan has a control target value of the host vehicle 2 based on the position of the host vehicle 2 on the target route. The position on the target route is a position on a map in the extension direction of the target route. The position on the target route means a set vertical position which is set for each predetermined interval (for example, 1 m) in the extension direction of the target route. The control target value is a value serving as a control target of the host vehicle 2 in the long-term traveling plan. The control target value is set so as to be associated for each set vertical position on the target route. The traveling plan generation unit 11 sets set vertical positions on the target route at predetermined intervals and sets a control target value for each set vertical position to generate the long-term traveling plan. The set vertical position and the target horizontal position may be collectively set as one set of positional coordinates. The set vertical position and the target horizontal position respectively mean information on the vertical position and information on the horizontal position which are set as targets in the long-term traveling plan.

The traveling plan generation unit 11 generates the short-term traveling plan on the basis of detection results of the external sensor 3 and the internal sensor 5, obstacle information, the position of the host vehicle 2, and the long-term traveling plan. The position of the host vehicle 2 is the position of the host vehicle 2 on the map which is recognized on the basis of the positional information of the host vehicle 2 which is received by the GPS reception unit 4 and the map information of the map database 6. The position of the host vehicle 2 may be recognized by acquiring a vehicle position, which is used in the navigation system 7, from the navigation system 7, or may be recognized and acquired from a sensor through communication in a case where the vehicle position of the host vehicle 2 is measured by the sensor installed on the road side.

The short-term traveling plan has a short-term control target value based on the set vertical position on the target route, similarly to the traveling plan. The short-term control target value is a value serving as a control target of the host vehicle 2 in the short-term traveling plan. The short-term control target value is set so as to be associated for each set vertical position on the target route. The short-term control target value includes a short-term target horizontal position of the host vehicle 2 and a short-term target vehicle speed of the host vehicle 2. The short-term target horizontal position is the horizontal position of the host vehicle 2 which serves as a control target in the short-term traveling plan. The short-term target vehicle speed is the vehicle speed of the host vehicle 2 which serves as a control target in the short-term traveling plan.

The traveling control unit 12 transmits a control signal to the actuator 8 on the basis of the traveling plan generated by the traveling plan generation unit 11. Thereby, the vehicle control of the host vehicle 2 is performed so that the host vehicle 2 automatically travels along the traveling plan.

Next, a configuration of the vehicle outside notification device 1 will be described.

The vehicle outside notification device 1 is a device that notifies a traffic participant, who is present in the vicinity of the host vehicle 2, of at least a host vehicle action schedule which is an action schedule of the host vehicle 2. The traffic participant is a person who can participate in traffic, and is, for example, a pedestrian, a bicycle driver, or the like. The traffic participant is not particularly limited, and may be various persons. The host vehicle action schedule includes, for example, at least one of a scheduled advancing direction (going straight, turning to the right, turning to the left, or the like) of the host vehicle 2, acceleration and deceleration conditions, temporary stop, passing an intersection, and a driving scene (overtaking, evacuation to an emergency road shoulder, or the like). For example, the host vehicle action schedule can be acquired from the traveling plan generated by the traveling plan generation unit 11. The host vehicle action schedule is not particularly limited, and may be various action schedules.

The vehicle outside notification device 1 includes an inter-vehicle communication unit 21 and a notification output unit 31. The vehicle outside notification device 1 includes a notification necessity determination unit 13, a preceding vehicle determination unit 14, an oncoming vehicle action schedule determination unit 15, and a notification control unit 16 as functional components of the ECU 10.

The inter-vehicle communication unit 21 is a device that communicates with another vehicle in the vicinity of the host vehicle 2. Here, in a case where an oncoming vehicle of the host vehicle 2 can perform inter-vehicle communication, the inter-vehicle communication unit 21 communicates with the oncoming vehicle. The inter-vehicle communication unit 21 acquires oncoming vehicle information regarding a traveling state of the oncoming vehicle. The traveling state in the oncoming vehicle information is the movement of the oncoming vehicle which is required to determine an action schedule of the oncoming vehicle, and includes at least one of the speed, acceleration and deceleration, a scheduled course, yaw moment, a traveling plan, and the like of the oncoming vehicle. The oncoming vehicle information may include the action schedule of the oncoming vehicle.

The notification output unit 31 outputs a notification to a traffic participant in the vicinity of the host vehicle 2. For example, the notification output unit 31 may include a notification lamp constituted by a plurality of Light Emitting Diodes (LEDs) provided in a front grille of the host vehicle 2. In this case, the notification output unit 31 outputs a notification by at least combination of lighting color of the notification lamp, a lighting color timing, and a lighting color pattern. In addition, the notification output unit 31 may include a speaker. In this case, the notification output unit 31 outputs a notification by generating a sound or a buzzer sound from the speaker. In addition, the notification output unit 31 may include a pedestrian-to-vehicle communication unit capable of communicating with a portable communication terminal, such as a portable terminal or a wearable terminal, which owned by a traffic participant. In this case, the notification output unit 31 communicates with the portable communication terminal and vibrates the portable communication terminal by using a vibration function to output a notification. In addition, the notification output unit 31 may include a device that captures an image. In this case, the notification output unit 31 outputs a notification by drawing a notification image on a road. In addition, the notification output unit 31 may output a notification by displaying an icon, such as an arrow, at a position in the host vehicle 2 which is perceivable from a traffic participant. The notification output unit 31 is not particularly limited, and various devices or apparatuses can be used.

For example, the notification output unit 31 may output a display including a stop message using color or flashing (lighting) to a portion of the front of the host vehicle 2, and may transmit the stop of the host vehicle 2 to the traffic participant. For example, the notification output unit 31 may display a direct message such as "please cross first" to the traffic participant. For example, the notification output unit 31 may output a direct sound message such as "please cross first" to the traffic participant. For example, the notification output unit 31 may output a sound, such as a beep sound, which has an attention-calling property to the traffic participant.

The notification necessity determination unit 13 determines whether it is necessary to provide a traffic participant in the vicinity of the host vehicle 2 with host vehicle action schedule, on the basis of surrounding environment information and host vehicle information. The surrounding environment information is information regarding the surrounding environment which is detected by the external sensor 3. The host vehicle information is information regarding the state of the host vehicle 2 which is detected by the internal sensor 5. For example, the notification necessity determination unit 13 determines that it is necessary to provide the notification in a case where it is determined that there is a possibility that the host vehicle 2 comes into contact with a traffic participant, on the basis of a movement trajectory of the traffic participant, which is predicted from the surrounding environment information, and a traveling plan of the host vehicle 2. Determination conditions in the notification necessity determination unit 13 are not particularly limited, and various conditions may be used. For example, the notification necessity determination unit 13 may determine that it is necessary to provide the notification in a case where a distance between the host vehicle 2 and the traffic participant is equal to or less than a fixed distance.

In a case where the notification necessity determination unit 13 determines that is it necessary to provide the notification, the preceding vehicle determination unit 14 determines whether or not a preceding vehicle of the host vehicle 2 is present, on the basis of the surrounding environment information which is detected by the external sensor 3. The oncoming vehicle action schedule determination unit 15 executes an oncoming vehicle action schedule determination process in a case where an oncoming vehicle of the host vehicle 2 is present. In the oncoming vehicle action schedule determination process, an oncoming vehicle action schedule which is an action schedule of an oncoming vehicle is determined. The oncoming vehicle action schedule includes, for example, at least any one of a scheduled advancing direction (going straight, turning to the right, turning to the left, or the like) of the oncoming vehicle, acceleration and deceleration conditions, temporary stop, passing an intersection, and a driving scene (overtaking, evacuation to an emergency road shoulder, or the like). The oncoming vehicle action schedule is not particularly limited, and may be various action schedules. Details of the oncoming vehicle action schedule determination process will be described later.

The notification control unit 16 controls the notification output unit 31 on the basis of a determination result of the preceding vehicle determination unit 14. The notification control unit 16 outputs a notification from the notification output unit 31 in a case where the preceding vehicle determination unit 14 determines that a preceding vehicle is not present. The notification control unit 16 restricts the output of the notification from the notification output unit 31 in a case where the preceding vehicle determination unit 14 determines that a preceding vehicle is present. In this embodiment, the notification control unit 16 stops (prohibits) the output of the notification from the notification output unit 31 as a restriction of the output of the notification, in a case where the preceding vehicle determination unit 14 determines that a preceding vehicle is present. That is, the notification control unit 16 outputs a notification from the notification output unit 31 only in a case where the preceding vehicle determination unit 14 determines that a preceding vehicle is not present. In addition, the notification control unit 16 outputs a notification regarding a host vehicle action schedule as a notification to be output from the notification output unit 31, in a case where an oncoming vehicle is not present. On the other hand, the notification control unit 16 outputs notifications regarding the host vehicle action schedule and the oncoming vehicle action schedule determined by the oncoming vehicle action schedule determination unit 15 as notifications to be output from the notification output unit 31, in a case where an oncoming vehicle is present.

Next, an example of processing executed by the vehicle outside notification device 1 will be described.

Figure 2:
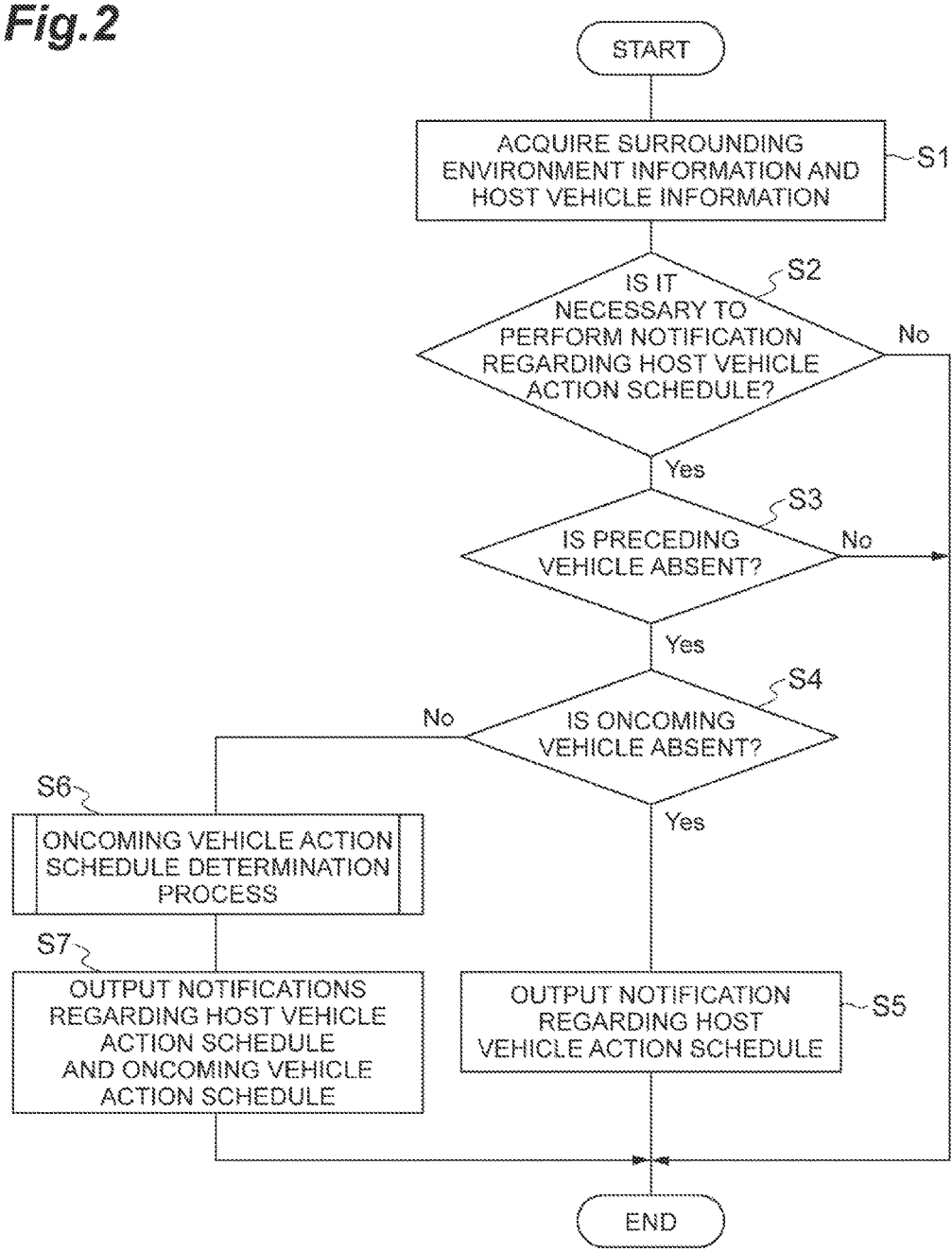
FIG. 2 is a flowchart illustrating an example of processing executed by the vehicle outside notification device according to the first embodiment.
Figure 3:
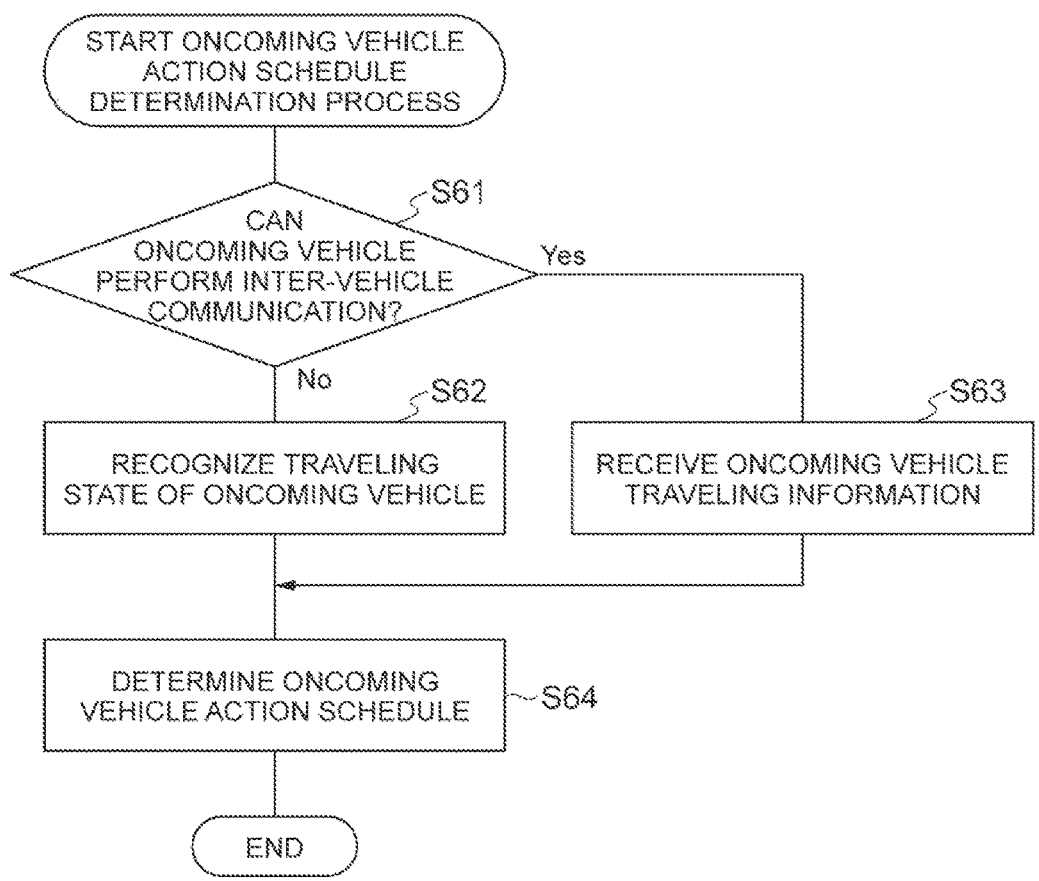
FIG. 3 is a flowchart illustrating an example of an oncoming vehicle action schedule determination process of FIG. 2.

FIG. 2 is a flowchart illustrating an example of processing executed by the vehicle outside notification device. FIG. 3 is a flowchart illustrating an example of the oncoming vehicle action schedule determination process of FIG. 2. In the vehicle outside notification device 1, for example, the following processing is started at the same time as when automatic driving of the automatic driving system 100 is started.

First, as illustrated in FIG. 2, surrounding environment information is acquired by the external sensor 3, and host vehicle information is acquired by the internal sensor 5 (step S1). The notification necessity determination unit 13 determines whether or not it is necessary to provide a traffic participant in the vicinity of the host vehicle 2 with host vehicle action schedule, on the basis of the surrounding environment information and the host vehicle information (step S2). In step S2, in a case where a traffic participant is detected from the surrounding environment information, movement trajectories of the traffic participant are predicted in time series. It is determined whether or not there is a possibility that the host vehicle 2 comes into contact with the traffic participant from the movement trajectories and a traveling plan of the host vehicle 2. It is determined that it is necessary to provide the notification, in a case where there is a possibility that the host vehicle 2 comes into contact with the traffic participant.

In a case where the determination result in step S2 is NO, the processing of this cycle is terminated without outputting a notification from the notification output unit 31, and the processing proceeds to step S1 of the next cycle. In a case where the determination result in step S2 is Yes, the preceding vehicle determination unit 14 determines whether or not a preceding vehicle of the host vehicle 2 is present on the basis of the surrounding environment information (step S3). In a case where the determination result in step S3 is No, the processing of this cycle is terminated without outputting a notification from the notification output unit 31, and the processing proceeds to step S1 of the next cycle. In a case where the determination result in step S3 is Yes, the oncoming vehicle action schedule determination unit 15 determines whether or not on oncoming vehicle of the host vehicle 2 is present on the basis of the surrounding environment information (step S4). In a case where the determination result in step S4 is Yes, the notification control unit 16 controls the notification output unit 31 so as to output a notification regarding the host vehicle action schedule (step S5). In a case where the determination result in step S4 is No, the oncoming vehicle action schedule determination unit 15 executes the oncoming vehicle action schedule determination process (step S6).

In the oncoming vehicle action schedule determination process of step S6, first, it is determined whether or not the oncoming vehicle can perform inter-vehicle communication, as illustrated in FIG. 3 (step S61). In step S61, for example, it is possible to determine whether or not the oncoming vehicle can perform inter-vehicle communication, on the basis of whether or not the inter-vehicle communication has been transmitted from the oncoming vehicle. In a case where the determination result in step S61 is No, a traveling state of the oncoming vehicle is recognized on the basis of the surrounding environment information (step S62). It is possible to adopt various known techniques for the recognition in step S62. In a case where the determination result in step S61 is Yes, oncoming vehicle information regarding the traveling state of the oncoming vehicle is received from the oncoming vehicle through the inter-vehicle communication (step S63). An oncoming vehicle action schedule is determined from the recognition result in a case where the traveling state of the oncoming vehicle is recognized in step S62, and is determined from the oncoming vehicle information in a case where the oncoming vehicle information is received in step S63 (step S64).

As illustrated in FIG. 2, after step S6 is performed, the notification control unit 16 controls the notification output unit 31 so as to output not only a notification regarding the host vehicle action schedule but also a notification regarding the oncoming vehicle action schedule determined in step S6 (S7). After step S5 is performed or after step S7 is performed, the processing returns to step S1 and is repeatedly executed. Meanwhile, each process executed by the vehicle outside notification device 1 is terminated, for example, in a case where predetermined termination conditions, such as the turn-off of an ignition of the host vehicle 2 and the termination of automatic driving of the automatic driving system 100, are satisfied.

As described above, in the vehicle outside notification device 1, in a case where a preceding vehicle of the host vehicle 2 is not present, a notification is output to a traffic participant in the vicinity of the host vehicle. On the other hand, in a case where a preceding vehicle of the host vehicle 2 is present, the output of the notification is restricted. Therefore, in a traffic situation, such as congestion, where a plurality of vehicles lie in a row, it is possible to suppress the output of the notification so as to satisfy a necessary and sufficient condition, and to prevent the surrounding traffic environment from being inundated with information to be notified. As a result, it is possible to prevent the traffic participant from feeling troublesome. It is possible to realize a traffic environment related to safety by a unified notification.

The vehicle outside notification device 1 determines the oncoming vehicle action schedule in a case where an oncoming vehicle of the host vehicle 2 is present, and outputs a notification regarding the action schedule and the oncoming vehicle action schedule of the host vehicle 2 as a notification to be output from the notification output unit 31. In this configuration, in a case where an oncoming vehicle is present, it is possible to output a notification further considering an action schedule of the oncoming vehicle in addition to the action schedule of the host vehicle 2.

Incidentally, the notification control unit 16 may output a notification regarding the host vehicle action schedule without depending on the presence or absence of an oncoming vehicle (that is, may output a notification regarding on the host vehicle action schedule even when an oncoming vehicle is present), as a notification to be output from the notification output unit 31.

Second Embodiment

Next, a second embodiment will be described. Hereinafter, differences from the first embodiment will be described, and a repeated description will be omitted.

Figure 4:
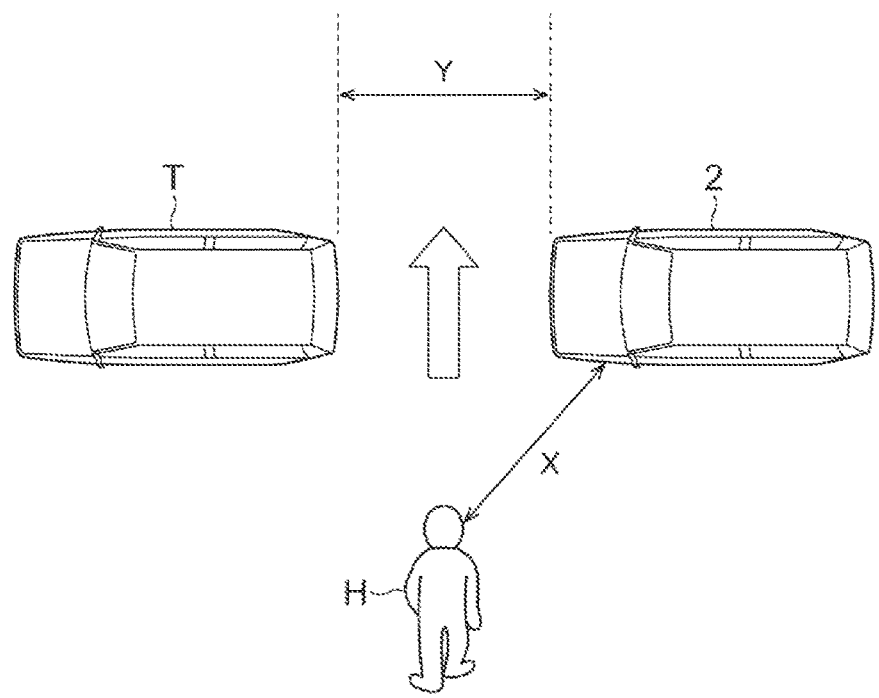
FIG. 4 is a bird's-eye view of the vicinity of a host vehicle for illustrating a vehicle outside notification device according to a second embodiment.

FIG. 4 is a bird's-eye view of the vicinity of a host vehicle for illustrating a vehicle outside notification device according to the second embodiment. A notification control unit 16 restricts the output of a notification from a notification output unit 31 in a case where a preceding vehicle determination unit 14 determines that a preceding vehicle is present. As illustrated in FIG. 4, in a case where the preceding vehicle determination unit 14 determines that a preceding vehicle T is present, the notification control unit 16 according to this embodiment does not output a notification from the notification output unit 31 when an inter-vehicle distance Y between a host vehicle 2 and the preceding vehicle T is equal to or less than a distance X between the host vehicle 2 and a traffic participant H. On the other hand, in a case where the preceding vehicle determination unit 14 determines that the preceding vehicle T is present, the notification control unit 16 outputs a notification from the notification output unit 31 when the inter-vehicle distance Y is larger than the distance X. That is, the notification control unit 16 according to the second embodiment outputs a notification from the notification output unit 31 in a case where the preceding vehicle determination unit 14 determines that a preceding vehicle is not present, and outputs a notification from the notification output unit 31 in a case where the inter-vehicle distance Y is larger than the distance X even when the preceding vehicle determination unit 14 determines that a preceding vehicle is present. In the second embodiment, the restriction of output of a notification in a case where the preceding vehicle determination unit 14 determines that the preceding vehicle T is present is the stop (prohibition) of output of a notification when the inter-vehicle distance Y is equal to or less than the distance X.

FIG. 5 is a flowchart illustrating an example of processing executed by the vehicle outside notification device according to the second embodiment. As illustrated in FIG. 5, in the vehicle outside notification device according to the second embodiment, the same processes as those (see FIG. 2) in the first embodiment are executed, except for step S11. That is, in step S1, surrounding environment information and host vehicle information are acquired. In step S2, it is determined whether it is necessary to provide a notification regarding a host vehicle action schedule. In a case where the determination result in step S2 is No, the processing of this cycle is terminated, and the processing proceeds to step S1 of the next cycle. On the other hand, in a case where the determination result in step S2 is Yes, it is determined in step S3 whether or not a preceding vehicle of the host vehicle 2 is present.

In a case where the determination result in step S3 is Yes, it is determined in step S4 whether or not an oncoming vehicle of the host vehicle 2 is present. In a case where the determination result in step S4 is Yes, a notification regarding the host vehicle action schedule is output in step S5. In a case where the determination result in step S4 is No, an oncoming vehicle action schedule determination process is executed in step S6, and an oncoming vehicle action schedule is determined. In step S7, notifications regarding the host vehicle action schedule and the oncoming vehicle action schedule are output.

Here, in a case where the determination result in step S3 is No, the notification control unit 16 determines whether or not the inter-vehicle distance Y between the host vehicle 2 and the preceding vehicle T is larger than the distance X between the host vehicle 2 and the traffic participant H (step S11). In a case where the determination result in step S11 is No, the processing of this cycle is terminated, and the processing proceeds to step S1 of the next cycle. In a case where the determination result in step S11 is Yes, a notification regarding the host vehicle action schedule is output in step S5. After step S5 is performed or after step S7 is performed, the processing returns to step S1 and is repeatedly executed.

As described above, in the vehicle outside notification device according to this embodiment, it is possible to exhibit the above-described effect of preventing a traffic participant from feeling troublesome. In addition, in the vehicle outside notification device according to this embodiment, in a case where it is determined that the preceding vehicle T is present, a notification is not output when the inter-vehicle distance Y is equal to or less than the distance X, and a notification is output when the inter-vehicle distance Y is larger than the distance X. Thereby, for example, it is possible to output a notification to a vehicle which is closest to the traffic participant H attempting to pass through between the host vehicle 2 and the preceding vehicle T. It is possible to effectively output a notification to the traffic participant H.

As described above, the embodiments have been described, but an aspect of the invention is implemented in various modes without being limited to the above-described embodiments.

In the above-described embodiments, the surrounding environment information of the host vehicle 2 has been acquired by the external sensor 3, but may be acquired on the basis of communication information through inter-vehicle communication, road-vehicle communication, or pedestrian-to-vehicle communication instead of or in addition to the acquisition method. In the above-described embodiments, a portion of the functions of the ECU 10 may be executed in a computer in facilities such as an information processing center capable of communicating with the host vehicle 2.

In the above-described embodiments, in a case where an oncoming vehicle is present, it may be determined whether or not the oncoming vehicle provides notifications of a host vehicle action schedule and an oncoming vehicle action schedule. In a case where it is determined that the oncoming vehicle provides notifications of the host vehicle action schedule and the oncoming vehicle action schedule, the output of a notification in the vehicle outside notification device 1 of the host vehicle 2 may be stopped (prohibited).

What is claimed is:

1. A vehicle outside notification device comprising:
   a notification necessity determination unit configured to determine whether or not it is necessary to provide a traffic participant in a vicinity of a host vehicle with notification regarding an action schedule of the host vehicle, on the basis of a surrounding environment of the host vehicle and a state of the host vehicle;
   a preceding vehicle determination unit configured to determine whether or not a preceding vehicle of the host vehicle is present on the basis of the surrounding environment of the host vehicle, in a case where the notification necessity determination unit determines that it is necessary to provide the notification;
   a notification output unit configured to output the notification; and
   a notification control unit configured to control the notification output unit on the basis of a determination result of the preceding vehicle determination unit,
   wherein the notification control unit is configured to output the notification from the notification output unit in a case where the preceding vehicle determination unit determines that the preceding vehicle is not present, and is configured to restrict the output of the notification from the notification output unit in a case where the preceding vehicle determination unit determines that the preceding vehicle is present.

2. The vehicle outside notification device according to claim 1,
   wherein the notification control unit is configured not to output the notification from the notification output unit when an inter-vehicle distance between the host vehicle and the preceding vehicle is equal to or less than a distance between the host vehicle and the traffic participant in a case where the preceding vehicle determination unit determines that the preceding vehicle is present, and is configured to output the notification from the notification output unit when the inter-vehicle distance between the host vehicle and the preceding vehicle is larger than the distance between the host vehicle and the traffic participant in a case where the preceding vehicle determination unit determines that the preceding vehicle is present.

3. The vehicle outside notification device according to claim 1, further comprising:
an oncoming vehicle action schedule determination unit configured to determine an action schedule of an oncoming vehicle in a case where the oncoming vehicle of the host vehicle is present,
wherein the notification control unit is configured to output notifications regarding the action schedule of the host vehicle and the action schedule of the oncoming vehicle which is determined by the oncoming vehicle action schedule determination unit from the notification output unit, in a case where the oncoming vehicle is present.

4. The vehicle outside notification device according to claim 2, further comprising:
an oncoming vehicle action schedule determination unit configured to determine an action schedule of an oncoming vehicle in a case where the oncoming vehicle of the host vehicle is present,
wherein the notification control unit is configured to output notifications regarding the action schedule of the host vehicle and the action schedule of the oncoming vehicle which is determined by the oncoming vehicle action schedule determination unit from the notification output unit, in a case where the oncoming vehicle is present.

* * * * *